United States Patent [19]

Nakamura et al.

[11] Patent Number: 4,699,263

[45] Date of Patent: Oct. 13, 1987

[54] FEEDING AND PROCESSING APPARATUS

[75] Inventors: Koichi Nakamura; Mitsuo Tanaka, both of Kanagawa, Japan

[73] Assignee: Nippon Sheet Glass Co., Ltd., Osaki, Japan

[21] Appl. No.: 792,984

[22] Filed: Oct. 30, 1985

[51] Int. Cl.[4] .............................................. B65G 47/26
[52] U.S. Cl. .................................... 198/435; 198/437; 198/463.3; 198/952; 414/331
[58] Field of Search ............... 198/425, 427, 435, 436, 198/437, 456, 457, 463.2, 463.3, 465.1, 468.6, 468.8, 952; 414/589, 495, 627, 659–661, 331, 278; 901/7, 16, 25

[56] References Cited

U.S. PATENT DOCUMENTS

| | | | |
|---|---|---|---|
| 2,536,756 | 1/1951 | Lopez | 198/435 X |
| 2,923,138 | 2/1960 | Rollins | 198/952 X |
| 3,258,103 | 6/1966 | Bontempi et al. | 198/435 X |
| 3,499,555 | 3/1970 | Wahle | 198/347 |
| 3,888,360 | 6/1975 | Ando et al. | 901/25 X |
| 3,895,729 | 7/1975 | Dukette | 901/16 X |
| 4,226,568 | 10/1980 | Christian | 414/589 |
| 4,362,454 | 12/1982 | Kripzak | 414/331 X |
| 4,481,782 | 11/1984 | Mukerjee | 198/952 X |
| 4,499,987 | 2/1985 | Long | 198/347 |
| 4,557,657 | 12/1985 | Olson et al. | 414/749 X |

FOREIGN PATENT DOCUMENTS 2399958  4/1979  France .................. 198/435

Primary Examiner—Robert J. Spar
Assistant Examiner—Lyle Kimms
Attorney, Agent, or Firm—Lowe, Price, LeBlanc, Becker & Shur

[57] ABSTRACT

A feeding and processing apparatus has a plurality of intermediate conveyor members disposed between upstream and downstream conveyor means, the intermediate conveyor members being vertically spaced. The feeding and processing apparatus also includes a device for vertically moving the intermediate conveyor members and a device disposed in the vicinity of at least a portion of the intermediate conveyor members for processing objects thereon.

18 Claims, 5 Drawing Figures

FEEDING AND PROCESSING APPARATUS

BACKGROUND OF THE INVENTION

The present invention relates to a feeding and processing apparatus for feeding a number of objects while at the same time cooling, heating, or otherwise processing them.

Sheets of glass are hot right after they are discharged from a heating furnace, and are required to be cooled while they are being fed to a next processing station.

If the hot glass sheets should be cooled by natural heat dissipation, the feeding apparatus would have to be increased in entire length or would have to feed the glass sheets at a reduced speed. Therefore, the feeding apparatus would be larger in size or the feeding efficiency thereof would be lowered.

SUMMARY OF THE INVENTION

Accordingly, it is an object of the present invention to provide a feeding and processing apparatus which takes up a small installation space and can successively and efficiently process and feed a number of objects that are successively discharged.

To achieve the above object, there is provided a feeding and processing apparatus comprising upstream conveyor means, downstream conveyor means, a plurality of vertically spaced intermediate conveyor members disposed between the upstream and downstream conveyor means for feeding objects from the upstream conveyor means to the downstream conveyor means, means for vertically moving the intermediate conveyor members, and means disposed in the vicinity of at least a portion of the intermediate conveyor members for processing the objects thereon.

With the above feeding and processing apparatus, the objects can be kept stopped in a feed path or line for a prescribed period of time and can uniformly be cooled or otherwise processed while they remain in the feed path.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

The present invention will be described as being embodied in an apparatus for feeding and cooling sheets of glass. However, the principles of the invention are also applicable to various other apparatus for feeding articles or objects while simultaneously processing them.

Figure 1:
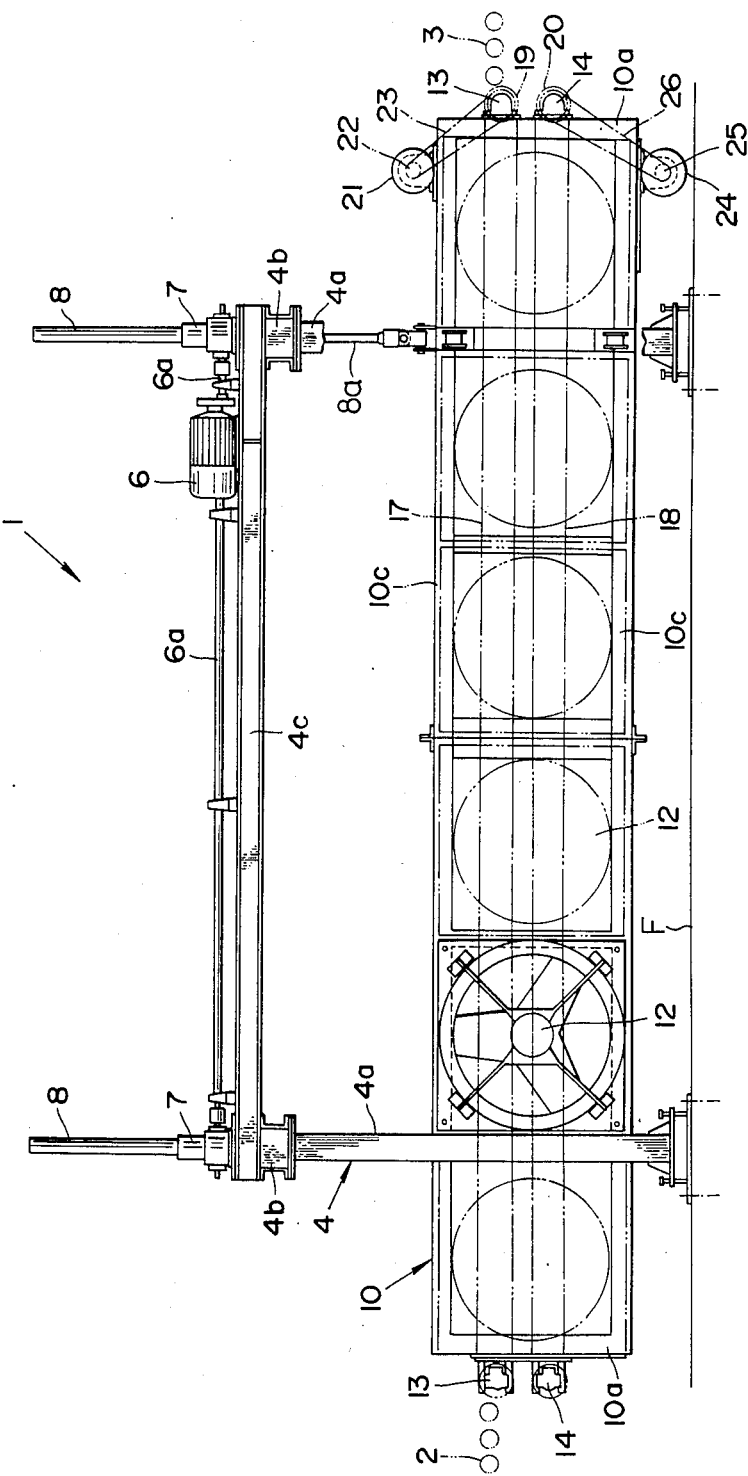
FIG. 1 is a front elevational view of a feeding and processing apparatus according to the present invention.
Figure 2:
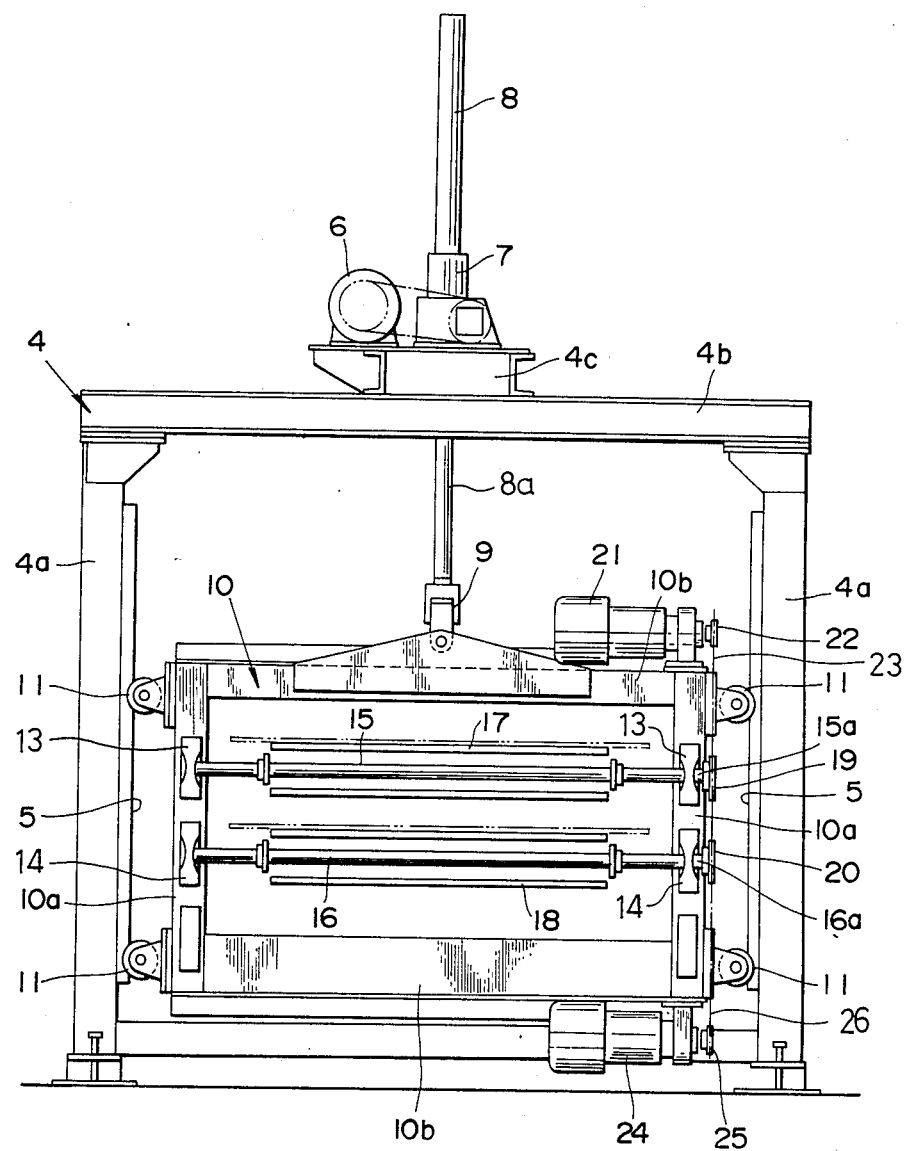
FIG. 2 is a side elevational view of the feeding and processing apparatus shown in FIG. 1.

As shown in FIGS. 1 and 2, a feeding and cooling apparatus 1 includes an upstream conveyor means comprising a plurality of conveyor rollers 2, a downstream conveyor means comprising a plurality of conveyor rollers 3, and an outer frame 4 disposed between the conveyor rollers 2, 3 and fixedly mounted on a floor F. The outer frame 4, serving as a base means, is composed of four posts 4a spaced from each other, a pair of transverse beams 4b extending perpendicularly to the direction of feed through the outer frame 4 and interconnecting the upper ends of the transversely paired posts 4a, and a single longitudinal beam 4c extending along the direction of feed between the centers of the transverse beams 4b. Rails 5 are attached to the inner sides of the posts 4a and extend longitudinally therealong. The longitudinal beam 4c supports thereon a pair of gear boxes 7 positioned at the longitudinal ends thereof and a motor 6 positioned at an intermediate portion thereof. The motor 6 has output shafts 6a supporting gears held in mesh with gears in the gear boxes 7. Vertical pipes 8 are fixedly mounted on the gear boxes 7, respectively. Rods 8a extend respectively through the vertical pipes 8 and also through the longitudinal beam 4c and the gear boxes 7, the rods 8a having rack teeth meshing with the gears in the gear boxes 7. Therefore, when the motor 6 is energized, the output shafts 6a are rotated to rotate the gears in the gear boxes 7, thus vertically moving the rods 8a.

An inner frame 10 is suspended from joints 9 attached respectively to the lower ends of the rods 8a. The inner frame 10 comprises vertical frame members 10a, transverse frame members 10b extending perpendicularly to the direction of feed and interconnecting the upper and lower ends of the vertical frame members 10a, and longitudinal frame members 10c extending along the direction of feed and interconnecting the transverse ends of the transverse frame members 10b. Casters 11 are mounted on the outer sides of the vertical frame members 10a and held in rolling engagement with the rails 5. When the motor 6 is energized, therefore, the inner frame 10 is vertically moved in its entirety within the outer frame 4.

A plurality of cooling fans 12 are mounted on each of the transverse sides of the inner frame 10 and positioned in an area surrounded by the vertical frame members 10a and the upper and lower longitudinal frame members 10c. The cooling fans 12 are arranged along the direction of feed (i.e., the horizontal direction in FIG. 1).

Bearings 13, 14 are mounted on the outer sides of the vertical frame members 10a which face the upstream and downstream conveyor rollers 2, 3. Rollers 15, 16 are rotatably supported on and extend horizontally between the bearings 13, 14. First and second conveyor belts 17, 18 are trained around the rollers 15, 16, respectively, the first and second conveyor belts 17, 18 serving as intermediate conveyor members. One of the rollers 15 (shown in FIG. 2) has one end projecting outwardly of the the bearing 13 and supporting thereon a sprocket 19. Similarly, one of the rollers 16 (shown in FIG. 2) has one end projecting outwardly of the the bearing 14 and supporting thereon a sprocket 20. A motor 21 is fixedly mounted on one (shown on the righthand side in FIG. 2) of the upper longitudinal frame members 10c, with a gear 22 fixed to the output shaft of the motor 21. A chain 23 is trained around the sprocket 19 and the gear 22. Likewise, a motor 24 is fixedly mounted on one (shown on the righthand side in FIG. 2) of the lower longitudinal frame members 10c, with a gear 25 fixed to the output shaft of the motor 24. A chain 26 is trained around the sprocket 20 and the gear 25.

Therefore, the upper first conveyor belt 17 operates by energizing the motor 21, and the lower second conveyor belt 18 operates by energizing the motor 24. These conveyor belts 17, 18 as they are in operation can feed sheets G of glass downstream from the upstream conveyor rollers 2 to the downstream conveyor rollers 3.

Operation of the feeding and cooling apparatus 1 thus constructed will be described with reference to FIGS. 3(A) through 3(C).

Figure 3A:
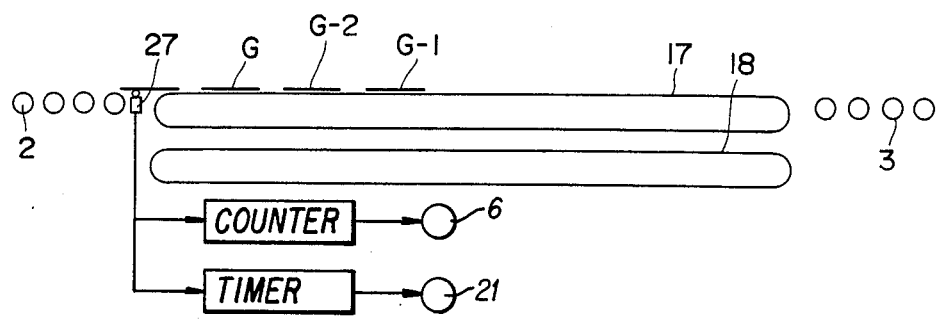
FIGS. 3(A) through 3(C) are schematic views showing operation of the feeding and processing apparatus.
Figure 3B:
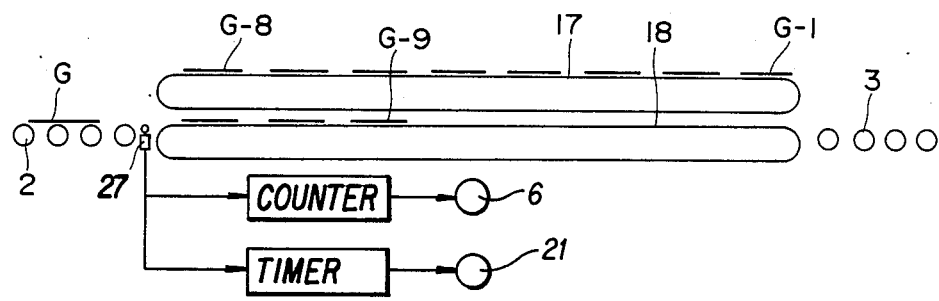

While the cooling fans 12 are in operation, the motor 6 is energized to lower the inner frame 10 for aligning the upper first conveyor belt 17 horizontally with the upstream and downstream conveyor rollers 2, 3, as shown in FIG. 3(A). A succession of glass sheets G are intermittently conveyed by the upstream conveyor rollers 2. When the first glass sheet G-1 triggers a limit switch 27, a timer (not shown) and a counter (not shown) start being energized. The motor 21 is energized for a period of time set by the timer to place the first glass sheet G-1 onto the conveyor belt 17, and the first glass sheet G-1 is counted by the counter.

Then, the second glass sheet G-2 actuates the limit switch 27 to energize the motor 21 again. The second glass sheet G-2 is therefore delivered onto the conveyor belt 17 and counted. The glass sheets are thus successively delivered from the upstream conveyor rollers 2 onto the upper first conveyor belt 17 as illustrated in FIG. 3(A).

When the first glass sheet G-1 reaches the downstream end of the conveyor belt 17, i.e., glass sheets G are fully supported on the conveyor belt 17, the counter detects such a condition and energizes the motor 6 to lift the inner frame 10 until the lower second belt 18 is aligned horizontally with the upstream and downstream conveyor rollers 2, 3. Then, glass sheets, starting from G-9, are successively placed onto the lower second conveyor belt 18, as illustrated in FIG. 3(B), in the same manner as described above.

When the counter detects that glass sheets G are fully placed on the lower second conveyor belt 18, the counter energizes the motor 6 in the reverse direction to lower the inner frame 10 until the upper first conveyor belt 17 is aligned with the upstream and downstream conveyor rollers 2, 3.

Figure 3C:
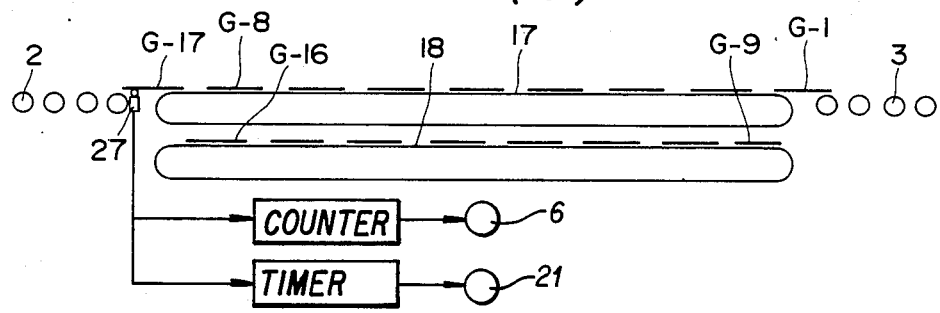

Upon actuation of the limit switch 27 by a following glass sheet G-17 delivered down by the upstream conveyor rollers 2, the timer and the counter are energized to move the upper first conveyor 17 to receive the glass sheet G-17 and discharge the first glass sheet G-1 onto the downstream conveyor rollers 3, as shown in FIG. 3(C).

The glass sheets G-1 trough G-8 are therefore successively delivered onto the downstream conveyor rollers 3 as new glass sheets G are fed onto the upper first conveyor belt 17. In response to the detection by the counter of the new glass sheets G fully placed on the upper first conveyor belt 17, the inner frame 10 is raised again to bring the lower second conveyor belt 18 into alignment with the upstream and downsream conveyor rollers 2, 3. New glass sheets G are then introduced onto the lower second conveyor 18 as the glass sheets G-9 through G-16 are successively discharged therefrom onto the downstream conveyor rollers 3. The above cycle is repeated to keep a succession of glass sheets stored for a given period of time in the inner frame 10 at all times while at the same time moving either the first or the second conveyor belt to discharge another succession of glass sheets. Consequently, the glass sheets can uniformly be cooled by the cooling fans 12 successively and efficiently at a high rate, and can also be fed successively and efficiently to a next processing station.

The inner frame 10 may accommodate three or more conveyor belts. The conveyor belts may comprise wire meshes or may be replaced with rollers. The apparatus 10 may be modified to feed and process other objects than glass sheets, and dependent on the objects to be fed and processed, the cooling fans 12 may be replaced with showers, heaters, humidifiers, germicidal lamps, or various other processing devices. The inner frame 10 may be vertically driven by not only the motor but also a pneumatic drive system, a hydraulic drive system, or other drive systems dependent on the load to be imposed on the drive system and the processing cycle time.

Although there has been described what is at present considered to be the preferred embodiment of the present invention, it will be understood that the invention may be embodied in other specific forms without departing from the spirit or essential characteristics thereof. The present embodiment is therefore to be considered in all aspects as illustrative, and not restrictive. The scope of the invention is indicated by the appended claims rather than by the foregoing description.

We claim:

1. A feeding and processing apparatus comprising:
   upstream conveyor means;
   downstream conveyor means;
   a plurality of vertically spaced intermediate conveyor members disposed between said upstream and downstream conveyor means for feeding objects from said upstream conveyor means to said downstream conveyor means;
   means for vertically moving said intermediate conveyor members; and
   means disposed in the vicinity of at least a portion of said intermediate conveyor members for processing the objects thereon,
   wherein one of said intermediate conveyor members is disposed between said upstream and downstream conveyor means and forms a path with said upstream and downstream conveyor means for objects being conveyed,
   said apparatus further comprising:
   switching means for determining conveying of an object to be processed on said intermediate conveyor members from said upstream conveyor means to said one of said intermediate conveyor members, together with
   counter means responsive to said switching means for counting a number of objects conveyed to said one intermediate conveyor member for processing thereon and, upon counting a predetermined number of objects conveyed to said one intermediate conveyor member, for causing said means for vertically moving said intermediate conveyor members to move said intermediate conveyor members vertically so that another of said intermediate conveyor members is positioned to receive objects from said upstream conveyor means to be processed on said another intermediate conveyor member, and
   wherein said counter means is further operable for counting said objects received by said another intermediate conveyor member until counting said predetermined number and, responsively to attaining said count, for further activating said means for vertically moving to move said conveyor members vertically and to move said another conveyor member vertically away from said path between said upstream and downstream conveyor means and to return said one intermediate conveyor member to said path between said upstream and downstream conveyor means for discharging the objects to said downstream conveyor means, whereby objects processed on an intermediate conveyor member are temporarily stored thereon in a location vertically displaced from a path connecting said upstream conveyor means and said downstream conveyor means while other objects are received for processing on another intermediate conveyor member.

2. A feeding and processing apparatus according to claim 1, including means for driving said intermediate conveyor members independently.

3. A feeding and processing apparatus according to claim 2, including a support frame by which said intermediate conveyor members are supported.

4. A feeding and processing apparatus according to claim 3, including base means, said vertically moving means being supported on said base means and operatively coupled to said support frame.

5. A feeding and processing apparatus according to claim 3, wherein said driving means is supported on said support frame.

6. A feeding and processing apparatus according to claim 4, wherein said base means comprises a plurality of substantially vertical posts each having guide means extending longitudinally therealong, said support frame being vertically movable along said guide means.

7. A feeding and processing apparatus according to claim 1, wherein said vertical moving means is arranged such that when one of said intermediate conveyor members is aligned horizontally with said upstream and downstream conveyor means, said vertical moving means is de-energized to stop the vertical movement of the intermediate conveyor members.

8. A feeding and processing apparatus as recited in claim 3, further comprising means disposed in the vicinity of at least a portion of said intermediate conveyor members for processing the objects thereon.

9. A feeding and processing apparatus according to claim 8, wherein said processing means comprises a plurality of cooling fans disposed on each of the sides of said support frame at intervals along a direction of feed along said intermediate conveyor members for blowing air against the objects.

10. A feeding and processing apparatus according to claim 8, wherein said vertically moving means includes vertically movable rods having lower ends coupled to said support frame, whereby said support frame is suspended from said rods.

11. A feeding and processing apparatus according to claim 1 wherein said means disposed in the vicinity of at least a portion of said intermediate conveyor members comprise fan means for cooling and drying the objects thereon while on said intermediate conveyor members.

12. A feeding and processing apparatus according to claim 6 wherein said support frame comprises a plurality of cooperating guide members mounted thereon and cooperating with said guide means extending along said substantially vertical posts of said base means.

13. A feeding and processing apparatus according to claim 12 wherein said guide means extending along said substantially vertical posts of said base means comprise rail means and said cooperating guide members comprise caster means mounted on said support frame and guided by said rail means on said base means.

14. A feeding and processing apparatus according to claim 13 wherein said means for vertically moving said intermediate conveyor members comprises motor means having output shaft means connected to gearing means, said gearing means providing geared connection to said support frame, said motor means operable for vertically displacing said support frame and said caster means mounted thereon along said rail means on said base means for guiding vertical movement of said support frame and said intermediate conveyor members.

15. A feeding and processing apparatus according to claim 12 wherein said means for vertically moving said intermediate conveyor members comprises motor means having output shaft means connected to gearing means, said gearing means providing geared connection to said support frame, said motor means operable for vertically displacing said support frame and said cooperating guide members mounted thereon for guiding vertical movement of said support frame and said intermediate conveyor members.

16. A feeding and processing apparatus according to claim 15 further comprising connecting means between said gearing means and said support frame, said connecting means comprising vertically displaceable connecting rods, said rods having toothed means for engaging said gear means and joint means for connection to said support frame.

17. A feeding and processing apparatus according to claim 16 wherein said upstream conveyor means and said downstream conveyor means comprise roller means and said intermediate conveyor members comprise belt means.

18. A feeding and processing apparatus according to claim 1 further comprising timer means responsive to said switching means for activating said means for driving said intermediate conveyor members for a predetermined time period in order to transfer an object from said upstream conveyor means to said intermediate conveyor members.

* * * * *